ASTABLE MULTIVIBRATOR PULSE GENERATOR CIRCUIT

Filed Aug. 8, 1960

Inventor:
Lawrence J. Regis,
by Gust & Irish
Attorneys.

United States Patent Office 3,039,065
Patented June 12, 1962

3,039,065
ASTABLE MULTIVIBRATOR PULSE GENERATOR CIRCUIT

Lawrence J. Regis, Fort Wayne, Ind., assignor to International Telephone and Telegraph Corporation Filed Aug. 8, 1960, Ser. No. 48,314
4 Claims. (Cl. 331—113)

This invention relates generally to astable or oscillating multivibrator circuits for producing a train of square output pulses, and more particularly to a circuit for providing output pulses having extremely steep rise and fall times.

Transistorized astable multivibrator circuits, such as that shown and described in Patent #2,737,587, issued March 6, 1956 to R. B. Trousdale, have been commonly employed. Such circuits obviously require low operating voltages for the transistors, and furthermore, when PNP transistors are employed, in order to assure reliable turn-on, a finite amount of base current must be supplied. In the particular case when the circuit is intended to provide pulses in the audio frequency range (50 through 500 cycles) the timing capacitors must be large (.1 microfarad or greater) and the timing resistors must be limited as to resistance in order to supply the requisite base current. It is desired that such a circuit provide an essentially square wave output. However, due to the large timing capacitors and thus their substantial charge storage capacity, the discharge time is appreciably long, and therefore, in prior circuits of this type known to the present applicant, the trailing edge of the output pulses has had an unduly long decay time.

It is accordingly an object of my invention to provide an improved astable multivibrator circuit having an essentially square wave output.

Another object of my invention is to provide an improved transistorized astable multivibrator circuit of the general type shown in the aforesaid Patent 2,737,587 in which the rise and fall times of the output waveform are extremely steep.

In accordance with the broader aspects of my invention, I provide an astable multivibrator pulse generator circuit comprising first and second valve devices each including a control electrode and rst and second rectifying electrodes. A source of direct current potential is provided and first and second impedance means respectively couple the first rectifying electrode of the valve devices to one side of the source with the second rectifying electrodes being respectively coupled to the other side of the source. First unidirectional current-conducting means is connected to the first rectifying electrode of the first valve device and first reactance means serially couples the same to the control electrode of the second device. Second unidirectional current-conducting means is connected to the first rectifying electrode of the second valve device and second reactance means serially couples the same to the control electrode of the first valve device. Third and fourth impedance means respectively couple the control electrodes of the first and second devices to the one side of the source and respectively form time constant circuits with the second and first reactance means for determining the duration of the pulses generated by the circuit. Fifth and sixth impedance means respectively couple the midpoints between the first unidirectional and first reactance means, and between the second unidirectional and second reactance means to the one side of the source. In accordance with a particular feature of my invention, the first and second unidirectional means are respectively polarized to isolate the first and second reactance means from the first rectifying electrode of the second and first valve devices respectively when the same tend to change from an upper potential level to a lower potential level while the respective reactance means discharges through the respective fifth and sixth impedance means. Output circuit means is provided coupled to one of the rectifying electrodes of one of the valve devices. In the preferred embodiment of my invention, the valve devices are transistors and the unidirectional current-conducting means are diodes.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
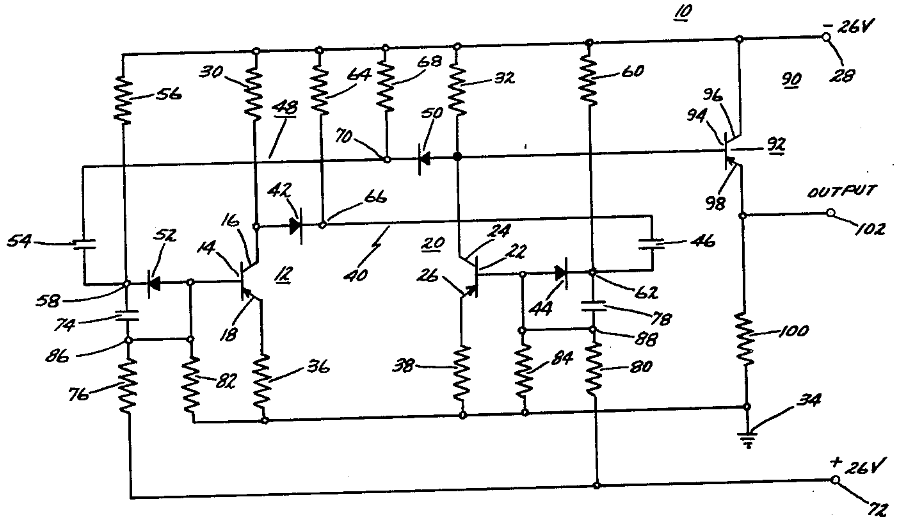
FIG. 1 is a schematic illustration of a transistorized astable multivibrator circuit incorporating my invention.

Referring now to the drawing, my improved astable multivibrator pulse generating circuit, generally identified at 10, comprises a first PNP transistor 12 having base 14, collector 16, and emitter 18, and a second PNP transistor 20 having base 22, collector 24 and emitter 26. Collectors 16 and 24 of transistors 12 and 20 are respectively connected to eource 28 of −26 volt direct current potential by resistors 30 and 32 while emitters 18 and 26 are respectively connected to the other side of source 28, shown as being ground 34, by resistors 36 and 38. A first series circuit 40 couples collector 16 of transistor 12 to base 22 of transistor 20 and comprises a first diode 42 directly connected to collector 16, a second diode 44 directly connected to base 22, and a first timing capacitor 46 directly connected to diodes 42 and 44. A second series circuit 48 connects collector 24 of transistor 20 to base 14 of transistor 12 and comprises a third diode 50 directly connected to collector 24, a fourth diode 52, directly connected to base 14, and a second timing capacitor 54 serially connecting diodes 50 and 52. It will be readily seen that diodes 42 and 44 in series circuit 40 are oppositely polarized and likewise that diodes 50 and 52 in series circuit 48 are oppositely polarized.

Timing resistor 56 connects midpoint 58 between diode 52 and capacitor 54 to source 28 and likewise timing resistor 60 connects midpoint 62 between diode 44 and capacitor 46 to source 28. Capacitor discharge resistor 64 connects midpoint 66 between diode 42 and capacitor 46 to source 28 and capacitor discharge resistor 68 connects midpoint 70 between diode 50 and capacitor 54 to source 28.

Midpoint 58 is serially connected to source 72 of +26 volt direct current potential by capacitor 74 and resistor 76 and midpoint 62 is likewise serially connected to source 72 by capacitor 78 and resistor 80. Base 14 of transistor 12 is connected to ground 34 by resistor 82 and base 22 of transistor 20 is connected to ground 34 by resistor 84. Base 14 of transistor 12 is connected to midpoint 86 between capacitor 74 and resistor 76 and base 22 of transistor 20 is connected to midpoint 88 between capacitor 78 and resistor 80, as shown.

An output circuit 90 is provided comprising PNP transistor 92 having its base 94 directly connected to collector 24 of transistor 20 with its collector 96 being directly connected to source 28 and its emitter 98 being connected to ground 34 by emitter-resistor 100. Output circuit 102 is directly connected to emitter 98 of transistor 92 in an emitter-follower configuration.

Describing the operation of the system of FIG. 1, it will first be assumed that transistor 20 is conducting and that transistor 12 is just beginning to conduct so that current is beginning to flow from ground 34 through resistor 36, the emitter-collector circuit 18, 16 of transistor 12, and resistor 30 to source 28. When transistor 12 was not conducting, the potential of its collector 16 closely approached that of source 28, i.e., −26 volts. When transistor 12 starts to conduct, the potential level of collector 16 begins to rise toward zero, this increased potential being reflected in the series circuit 40 through diode 42 and capacitor 46 to diode 44. The increased potential of conductor 16 of transistor 12 thus back-biases diode 44 to terminate its conduction; diode 44 had previously been conducting in a series circuit provided by resistors 84 and 60 thus to provide base current for base 22 of transistor 20. With diode 44 cut off by virtue of the increase in the potential level of collector 16, transistor 20 is turned-off. Timing capacitor 46 then charges toward the −26 volt level through a circuit starting with ground 34, resistor 36, emitter and collector 18, 16 of transistor 12, diode 42, and resistor 60, the duration of the charging characteristic being determined by the constants of resistors 36 and 60 and capacitor 46. When capacitor 46 has been charged to a predetermined level in the direction of −26 volts of source 28, the back-bias of diode 44 is lowered sufficiently to permit diode 44 again to conduct, thereby again providing the requisite base bias on base 22 of transistor 20 to turn transistor 20 on. Immediately prior to turn on of transistor 20, the potential level of its collector 24 had been essentially that of source 28, i.e., −26 volts, and thus its potential now increases in the direction toward zero as the current flow increases and the potential drop across resistor 32 increases. As previously explained, this increase in the potential level of collector 44 is reflected through diode 50 and capacitor 54 to diode 52, back-biasing the same to terminate conduction of diode 52 and thus to turn off transistor 12 whereupon timing capacitor 54 now charges from ground 34 through resistor 38, transistor 20, diode 50 and resistor 56 until the back bias on diode 52 is sufficiently lowered toward −26 volts to permit its conduction and to again turn on transistor 12.

The mode of operation of FIG. 1 as thus far described corresponds to that of the circuit shown in the aforesaid Patent #2,737,587. Assume now momentarily that diodes 42 and 50 together with resistors 64 and 68 are omitted from the circuit, i.e., with capacitors 46 and 54 being respectively directly connected to collectors 16 and 24 of transistors 12 and 20. Assume further the condition just described in which the back bias on diode 52 has been sufficiently lowered to permit it again to conduct thereby turning on transistor 12 and causing the potential level of its collector 16 to rise from essentially −26 volts toward zero. As previously described, this increase in the potential level of collector 16 of transistor 12 responsive to the same being turned on is reflected through capacitor 46 to diode 44 to back bias the same to terminote its conduction and thereby to turn off transistor 20. With transistor 20 turned off, the potential level of its collector 24 tends immediately to rise to essentially the −26 volt level of source 28. However, with diode 50 and resistor 68 omitted from the circuit, it will be seen that collector 24 of transistor 20 is directly connected to capacitor 54; after capacitor 54 has charged to a point sufficient to again initiate conduction of diode 52 so that transistor 12 is turned on, capacitor 54 will, in the absence of diode 50 and resistor 68, discharge through the circuit provided by resistors 32 and 56, the duration of the discharge being determined by the constants of resistors 32 and 56 and capacitor 54. Thus, in the absence of diode 50 and resistor 68, collector 24 of transistor 20 cannot immediately go to essentially −26 volts, but rather can only go to −26 volts as permitted by the discharge characteristic of capacitor 54.

Figure 2:
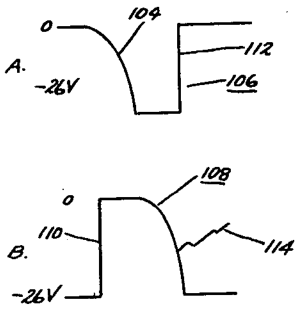
FIG. 2 is a diagram showing output pulse waveforms provided by circuits which do not incorporate my invention.

As previously indicated, in the case of a circuit intended to operate in the audio frequency range, and with the low voltage, i.e., 26 volts, required for operating the transistors, the discharge characteristic of the timing capacitors 46 and 54 is appreciably long, and thus the output pulse waveform under these circumstances will be as shown in FIG. 2A; the appreciably long decay time of leading edge 104 of output pulse 106 under the circumstances just described, obviously does not provide a pulse having the desired square waveform. The pulse 108 shown in FIG. 2B is the potential level of collector 16 of transistor 12. It will be seen that transistor 12 turns on to provide leading edge 110 of pulse 108 with the potential of collector 16 immediately rising from −26 volts to essentially zero, whereas transistor 20 is not simultaneously immediately turned off, but rather for the reasons above described the potential level of its collector 24 follows curve 104 of FIG. 2A which in turn follows the discharge characteristic of capacitor 54. It will further be seen that with diode 42 and resistor 64 omitted, transistor 20 will turn on immediately to provide trailing edge 112 of pulse 106, however, transistor 12 does not immediately turn off, but rather, by virtue of the fact that under the circumstances described collector 16 is directly connected to timing capacitor 46, the potential level of collector 16 will decay toward the −26 volt level to provide trailing edge 114 of pulse 108, the decay being responsive to the discharge characteristic of capacitor 46.

Figure 3:
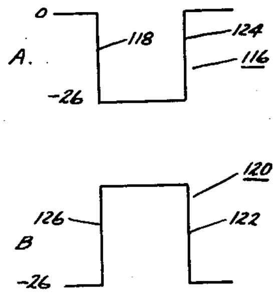
FIG. 3 shows output pulse waveforms provided by the circuit of my invention.

In order to eliminate the slow decay of the potential level of the collectors 16 and 24 of transistors 12 and 20 when the same are respectively turned off, I have provided transistors 42 and 50 and accompanying capacitor discharge resistors 64 and 68. Assuming now the conditions described above, in which transistor 20 is turned on and transistor 12 is just being turned on so that the potential level of collector 16 rises from its prior −26 volt level to a higher level approaching zero. This increase in the potential level of collector 16 is reflected through diode 42, and capacitor 46 to back-bias diode 44 thereby to terminate its conduction and to turn off transistor 20. With diode 50 present connecting collector 24 of transistor 20 to capacitor 54, it will be seen that the potential level of collector 24 is now free immediately to fall to essentially −26 volts, diode 50 serving to isolate collector 24 from capacitor 54. Capacitor 54 must discharge, however, and for this purpose discharge resistor 68 is provided so that capacitor 54 discharges through the circuit provided by resistors 56 and 68, collector 24 of transistor 20 having in the meantime fallen to essentially −26 volts, thus providing an essentially square output pulse 116 as shown in FIG. 3A, having an extremely steep leading edge 118, as opposed to the slow decay of the leading edge 104 of pulse 106 as shown in FIG. 2A. The other diode 42 and capacitor discharge resistor 64 function in the same manner with respect to collector 16 of transistor 12 and timing capacitor 46. Thus, when transistor 20 is turned on in turn providing a sudden increase in the potential of its collector 24 from essentially −26 volts toward zero, this increase being reflected through diode 50 and capacitor 54 to terminate conduction of diode 52 and to turn off transistor 12. Collector 16 of transistor 12 is now free immediately to fall to its essential −26 volts, being isolated from timing capacitor 46 and its discharge characteristic by virtue of the presence of diode 42, capacitor 46 now discharging through resistors 60 and 64. Thus, the essentially square wave configuration 120 shown in FIG. 3B is provided at collector 16 of transistor 12 with the fall time of trailing edge 122 being extremely steep in contrast with the gradual decay of the trailing edge 114 of pulse 108 of FIG. 2B.

It will be readily apparent that the polarity of the output pulses 116 in output circuit 102 may be inverted by reversing the polarities of sources 28 and 72, i.e., making source 28 +26 volts and source 72 −26 volts, by substituting NPN transistors for the PNP transistors 12 and 20, and reversing the polarities of all of the diodes 42, 44, 50 and 52.

In the circuit shown in FIG. 1, diodes 44 and 52 respectively serve to isolate base 22 of transistor 20 and base 14 of transistor 12 from the charging characteristic of the timing capacitors 46 and 54 to provide the steep rise times of trailing edge 112 of pulse 106 and leading edge 110 of pulse 108, as shown in FIGS. 2A and B, and likewise the steep trailing edge 124 of pulse 116 and leading edge 126 of pulse 120 as shown in FIGS. 3A and B.

A specific circuit in accordance with FIG. 1 employed the following component values:

| | |
|---|---|
| Transistors 12, 20, 92 | 2N525 |
| Diodes 42, 44, 50 and 52 | 1N457 |
| Resistors 30, 32, 64 and 68 ohms | 22,000 |
| Resistors 36 and 38 do | 220 |
| Resistors 82 and 84 do | 10,000 |
| Resistors 76 and 80 do | 470 |
| Resistors 56 and 60 do | 127,000 |
| Capacitors 46 and 54 microfarads | .12 |
| Capacitors 74 and 78 do | 47 |
| Resistor 100 ohms | 10,000 |

In a circuit having the above component values, a 50 cycle per second square wave was provided with the rise and fall times of the output waveform being respectively less than ten (10) microseconds.

It will now be seen that I have provided a transistorized astable multivibrator circuit particularly suitable for use in generating audio frequency pulses in which the output pulses are essentially square having extremely steep rise and fall times.

While I have described above the principles of my invention in connection with specific apparatus, it is to be clearly understood that this description is made only by way of example and not as a limitation to the scope of my invention.

What is claimed is:

1. An astable multivibrator pulse generator circuit comprising: first and second valve devices each including a control electrode and first and second rectifying electrodes; a source of direct current potential; first and second impedance means respectively coupling the first rectifying electrode of said valve devices to one side of said source, the second rectifying elements of said devices being respectively coupled to the other side of said source; a first series circuit comprising first unidirectional current-conducting means connected to the first rectifying electrode of the first of said devices, second unidirectional current-conducting means connected to the control electrode of the second of said devices, and first reactance means serially connecting said first and second unidirectional devices, said first and second unidirectional devices being oppositely polarized; a second series circuit comprising third unidirectional current-conducting means connected to the first rectifying electrode of the second of said devices, fourth unidirectional current-conducting means connected to the control electrode of the first of said devices, and second reactance means serially connecting said third and fourth unidirectional devices, said third and fourth unidirectional devices being oppositely polarized; third and fourth impedance means respectively coupling the midpoints between said first reactance means and second unidirectional means, and between said second reactance means and fourth unidirectional means to said one side of said source and respectively forming time constant circuits with said second and first reactance means for determining the duration of the pulses generated by said circuit; fifth and sixth impedance means respectively coupling the midpoints between said first unidirectional means and first reactance means, and between said third unidirectional means and second reactance means to said one side of said source; said first and third unidirectional means being respectively polarized to isolate said first and second reactance means from the first rectifying electrode of the second and first device respectively when the same tend to change from an upper potential level to a lower potential level while the respective reactance means discharges through the respective fifth and sixth impedance means; and output circuit means coupled to one rectifying electrode of one of said devices.

2. An astable multivibrator pulse generator circuit comprising: first and second valve devices each including a control electrode and first and second rectifying electrodes; a source of direct current potential; first and second resistance elements respectively connecting the first rectifying electrode of said valve devices to one side of said source, the second rectifying elements of said valve devices being respectively coupled to the other side of said source; a first series circuit comprising a first diode device directly connected to the first rectifying electrode of the first of said valve devices, a second diode device directly connected to the control electrode of the second of said valve devices, and a first capacitor serially connecting said first and second diode devices, said first and second diode devices being oppositely polarized; a second series circuit comprising a third diode device directly connected to the first rectifying electrode of the second of said valve devices, a fourth diode device directly connected to the control electrode of said first valve device, and a second capacitor serially connecting said third and fourth diode devices, said third and fourth diode devices being oppositely polarized; third and fourth resistance elements respectively connecting the midpoints between said first capacitor and second diode device, and between said second capacitor and fourth diode device to said one side of said source and respectively forming time constant circuits with said second and first capacitors for determining the duration of the pulses generated by said circuit; fifth and sixth resistance elements respectively connecting the midpoints between said first diode device and first capacitor, and between said third diode device and second capacitor to said one side of said source; said first and third diode devices being respectively polarized to isolate said first and second capacitor from the first rectifying electrode of said second and first valve devices respectively when the same tend to change from a higher to a lower potential level while the respective capacitor discharges through the respective fifth and sixth resistance element; and output circuit means coupled to the first rectifying electrode of one of said valve devices.

3. The combination of claim 2 wherein said valve devices are transistors with said control electrodes being the bases thereof and said rectifying electrodes being the collectors and emitters.

4. The combination of claim 3 wherein said first rectifying electrodes are the collectors and said second rectifying electrodes are the emitters, said emitters being resistively connected to said other side of said source.

References Cited in the file of this patent

UNITED STATES PATENTS 2,787,712 Priebe et al. ------------ Apr. 2, 1957